(12) United States Patent
Zhang et al.

(10) Patent No.: US 9,035,657 B2
(45) Date of Patent: May 19, 2015

(54) ELECTROMAGNETIC LOGGING BETWEEN A CASED BOREHOLE AND SURFACE

(75) Inventors: Hong Zhang, El Sobrante, CA (US); Richard A. Rosthal, Richmond, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1045 days.

(21) Appl. No.: 12/705,826

(22) Filed: Feb. 15, 2010

(65) Prior Publication Data
US 2010/0259268 A1    Oct. 14, 2010

Related U.S. Application Data

(60) Provisional application No. 61/248,162, filed on Oct. 2, 2009, provisional application No. 61/168,281, filed on Apr. 10, 2009.

(51) Int. Cl.
*G01V 3/10* (2006.01)
*G01V 3/28* (2006.01)

(52) U.S. Cl.
CPC ........................................ *G01V 3/28* (2013.01)

(58) Field of Classification Search
USPC .................................. 324/323–339, 345–375
See application file for complete search history.

(56) References Cited

U.S. PATENT DOCUMENTS

| | | | |
|---|---|---|---|
| 3,900,878 A * | 8/1975 | Tsao | 340/854.5 |
| 4,009,609 A | 3/1977 | Sayer et al. | |
| 4,689,572 A | 8/1987 | Clark | |
| 4,710,708 A * | 12/1987 | Rorden et al. | 324/207.26 |
| 4,953,137 A * | 8/1990 | Medlin | 367/31 |
| 5,698,982 A * | 12/1997 | Mitchell | 324/339 |
| 6,078,868 A | 6/2000 | Dubinsky | |
| 6,219,619 B1 | 4/2001 | Xiao et al. | |

(Continued)

FOREIGN PATENT DOCUMENTS

GB          2437144 A1     10/2007
WO    WO 2007136451 A2 *  11/2007

OTHER PUBLICATIONS

International Search Report issued in PCT/US2010/050338 on Jun. 29, 2011, 3 pages.

(Continued)

*Primary Examiner* — Huy Q Phan
*Assistant Examiner* — Temilade S Rhodes-Vivour
(74) *Attorney, Agent, or Firm* — Cathy Hewitt; Michael Dae

(57) ABSTRACT

The present disclosure relates to systems and methods for conducting an electromagnetic borehole-to-surface survey of a formation surrounding a borehole. Such methods include deploying a dipole transmitter into the borehole to a depth of investigation, deploying an array of electromagnetic receivers outside of the wellbore, and measuring a response of the formation at the array of electromagnetic receivers deployed outside of the wellbore, for example at the surface. From the response of the formation a property of the formation can be determined based on the response of the formation measured at the array of electromagnetic receivers. For the scenario of a cased well, a local reference receiver may be added at a location proximate the borehole to measure the effective magnetic moment of the transmitter inside the casing, and normalize the formation response in order for a more accurate determination of a formation characteristic, such as resistivity. These receivers can also be used for other types of surveys.

27 Claims, 4 Drawing Sheets

(56) References Cited

U.S. PATENT DOCUMENTS

| | | | | |
|---|---|---|---|---|
| 6,294,917 | B1* | 9/2001 | Nichols | 324/339 |
| 7,126,338 | B2* | 10/2006 | MacGregor et al. | 324/334 |
| 7,259,689 | B2 | 8/2007 | Hernandez-Marti et al. | |
| 7,477,162 | B2 | 1/2009 | Clark | |
| 7,495,446 | B2 | 2/2009 | Lovell et al. | |
| 7,502,690 | B2* | 3/2009 | Thomsen et al. | 702/2 |
| 7,586,313 | B2 | 9/2009 | Hernandez-Marti et al. | |
| 7,941,273 | B2* | 5/2011 | Thomsen et al. | 702/2 |
| 8,638,103 | B2 | 1/2014 | Rosthal et al. | |
| 2001/0030076 | A1* | 10/2001 | Paulsson | 181/102 |
| 2003/0004646 | A1 | 1/2003 | Haugland | |
| 2003/0038634 | A1* | 2/2003 | Strack | 324/323 |
| 2005/0256642 | A1 | 11/2005 | Barber et al. | |
| 2006/0155471 | A1 | 7/2006 | Tabarovsky et al. | |
| 2007/0052551 | A1 | 3/2007 | Lovell et al. | |
| 2007/0074908 | A1 | 4/2007 | Utter et al. | |
| 2008/0025146 | A1 | 1/2008 | Welker | |
| 2008/0061789 | A1* | 3/2008 | Coates et al. | 324/333 |
| 2008/0086270 | A1* | 4/2008 | Mathiszik | 702/9 |
| 2008/0205196 | A1* | 8/2008 | Love et al. | 367/138 |
| 2009/0160445 | A1 | 6/2009 | Hall et al. | |
| 2009/0302850 | A1* | 12/2009 | Lopez et al. | 324/337 |
| 2010/0118956 | A1 | 5/2010 | Fernandez et al. | |

OTHER PUBLICATIONS

Alumbaugh et al., "Theoretical and practical considerations for crosswell electromagnetic tomography assuming a cylindrical geometry", Geophysics, vol. 60, No. 3, 1995, p. 846-870.

DePavia et al., "Next generation cross-well EM imaging tool", SPE, 2008, 11 pgs.

B.R. Spies et al., "Sensitivity analysis of crosswell electromagnetics", Geophysics, vol. 60, No. 3, p. 834-845.

M. J. Wilt et al., "Crosswell electromagnetic tomography: system design considerations and field results", Geophysics, vol. 60, No. 3, 1995, p. 871-885.

* cited by examiner

ELECTROMAGNETIC LOGGING BETWEEN A CASED BOREHOLE AND SURFACE

CROSS-REFERENCE TO OTHER APPLICATIONS

The present application claims priority to U.S. Provisional Patent Application Ser. No. 61/248,162, filed Oct. 2, 2009, entitled "Marine Borehole to Surface Electromagnetic Survey with Transmitter in Well Casings." The present application also relates to U.S. Provisional Patent Application Ser. No. 61/168,281, entitled "Borehole to Surface Resistivity Logging," filed Apr. 10, 2009, and filed non-provisionally Oct. 21, 2009 as U.S. patent application Ser. No. 12/603,053, each of which is hereby incorporated by reference

TECHNICAL FIELD

The present application relates generally to the field of electromagnetic logging, and particularly to electromagnetic (EM) logging using one or more transmitters disposed in a cased borehole and one or more receivers located on the surface.

BACKGROUND

One technique to measure formation resistivity involves the use of electromagnetic induction via transmitters of low frequency magnetic fields that induce electrical currents in the formation. These induced electrical currents in turn produce secondary magnetic fields that can be measured by a magnetic field receiver.

Resistivity measurements of the earth's subsurface between proximately located wellbores are known as "crosswell measurements". Various tools and methods to perform crosswell logging, and thereby obtain crosswell measurement data sets, are known in the art. A crosswell data set is typically collected by moving a transmitter in one well and a receiver array in another well. Measurements of the electric and magnetic fields corresponding to various positions of the transmitter and receiver array are made. A sophisticated inversion process is necessary to interpret this data set and obtain a resistivity image of the region between the wells. A typical crosswell logging system uses a transmitter that produces a large vertical magnetic moment and very sensitive receivers that are particularly sensitive to the vertical moment of the magnetic field.

Several of the systems designed for crosswell logging use magnetic field transmitters and receivers. Those transmitters and receivers produce magnetic dipole moments oriented along the longitudinal axis of the tool. In principal, either or both of the wells can be cased. However, in practice, the use of standard magnetic steel casing for both wells is problematic due to the severe attenuation caused by the casing. Successful and useful logs have been obtained where both wells are open holes or where the receiver well is cased with magnetic casing. In addition, successful logs have been obtained where one or both wells are cased with steel having a high chromium content. That casing is non-magnetic and has a lower conductivity than standard casing. As a result, the attenuation is much less than with standard magnetic steel casing.

There are also various tools that transmit an electromagnetic signal from within a wellbore to one or more receivers located on the surface. For example, there is a wireline tool designed to measure formation resistivity in cased wells, a logging-while-drilling (LWD) tool that sends a current across an insulated gap in the tool and into the formation, a production logging tool that provides for wireless telemetry between a downhole component and the surface, and an EM telemetry tool used as an alternative to mud pulse telemetry that applies a voltage across an insulated gap in the tool to create an E-dipole source (E-Pulse is described in commonly owned/assigned U.S. Pat. No. 7,477,162).

SUMMARY

The present disclosure relates to borehole-to-surface (including seafloor) electromagnetic induction logging in openhole or metallic cased wells.

Figure 1:
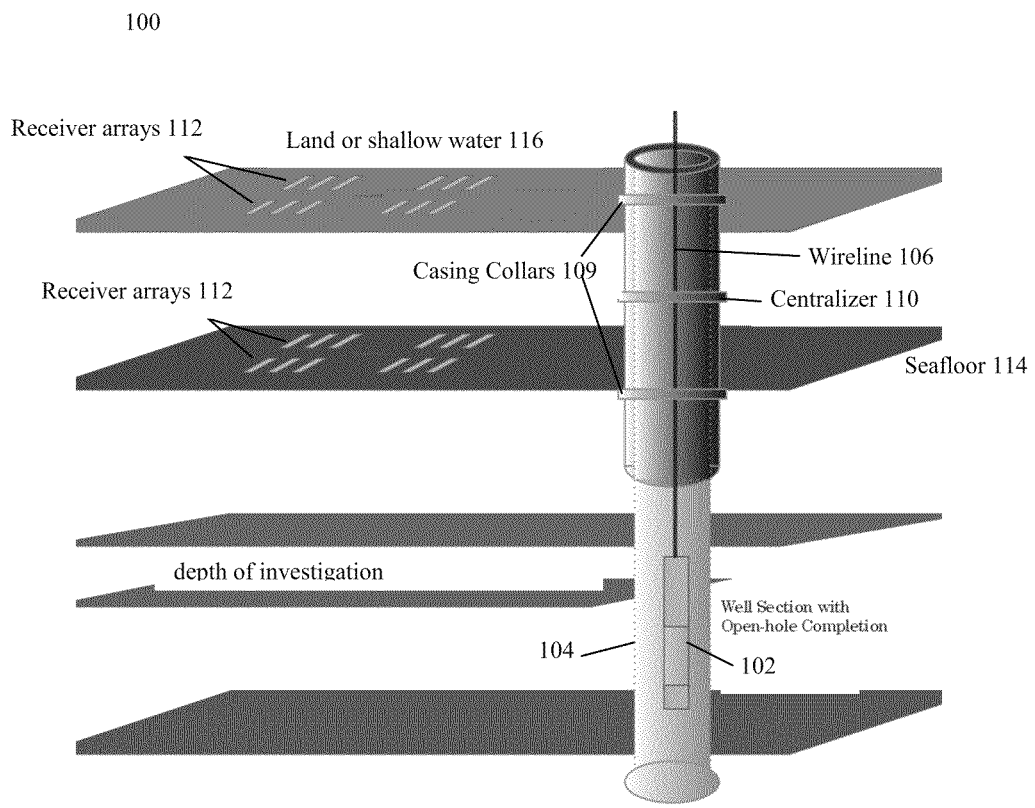
FIGS. 1 and 2 are schematic views of embodiments of geometries used to make borehole-to-surface resistivity measurements, in accordance with the present disclosure.

It is to be understood that the drawings are not to scale and to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency. In the following description, numerous details are set forth to provide an understanding of the present invention. However, it will be understood by those skilled in the art that the present invention may be practiced without many of these details and that numerous variations or modifications from the described embodiments are possible. The term "vertical", as used herein, means substantially aligned with or parallel to the longitudinal axis of a wellbore, unless indicated otherwise.

Complementary measurements to crosswell logging are surface-to-borehole or borehole-to-surface measurements. For such measurements, a source is placed at the surface and receivers downhole, or vice versa. Surface-to-borehole experiments have been performed in which the source was an electric dipole (e.g., a large generator connected to two stakes driven into the earth) and the receiver was a conventional crosswell magnetic field receiver that sensed the vertical component of the resulting magnetic field. Borehole-to-surface using downhole E-dipole source has been proposed in U.S. patent application Ser. No. 12/603,053. It should be noted that measuring the vertical electric field in a cased well is fairly impractical.

There are five observations relating to previous measurements that form the basis of the present disclosure relating to borehole-to-surface measurements using downhole magnetic dipole source. These previous measurements are performed in crosswell EM surveys employing magnetic dipole sources inside one well with receiver strings deployed in a second well, or in surface to borehole (STB) surveys wherein either line current sources and/or surface current loop sources are placed on the surface while receiver strings are deployed to various depths into steel cased wells. The observations follow:

1. A configuration including a single downhole transmitter source with multiple receiver stations placed either in the borehole, on the surface, or at the sea floor is more time and cost efficient for deployment during EM surveys.
2. The limitation on the downhole transmitter moment mainly arises from the design of the logging cable, the number of turns of the transmitter coil, and the magnetic permeability and size of the transmitter core. Recent advances in logging cable technology allows delivery of high power to downhole transmitters that provide downhole transmitters with large moments previously hereto not achieved.
3. It is possible to optimize the design and engineer a shorter magnetic dipole transmitter for cased well applications. The transmitter in the presently employed system (DeepLook EM™) has a long magnetic core that is not optimized for operating in steel cased wells.
4. The effective magnetic moment of a transmitter coil inside steel casing can be measured using receivers placed outside of and relatively close to the steel casing, as long as there are no casing collars and casing centralizers that are overlap with the transmitter coil.
5. An array of receivers placed for a magnetotelluric (MT) or Controlled Source Electro-Magnetic (CSEM) survey could also be employed for a Borehole-to-surface survey with a downhole magnetic and/or electrical dipole source.

As indicated U.S. patent application Ser. No. 12/603,053, there are commercial tools that transmit from downhole locations to receivers at the surface. The above-mentioned LWD tool transmits data collected by the tool to the surface by creating a voltage difference across an insulated section on the surface of the drill collar. This voltage is modulated in the frequency range of 0.1875-12 Hz to transmit data to the surface. At the surface, electrodes measure the voltage (generally between the wellhead and a distant electrode) and the data is demodulated. The tool has downhole memory and is capable of recording the voltage and current across the gap, or otherwise makes measurements from which the voltage and current can be obtained.

The above-mentioned production logging tool operates on the same principal, but also has the ability to receive transmissions from the surface. It operates in the frequency range of 0.25-3 Hz. Both tools are designed to transmit signals from a downhole antenna having a vertical electric dipole moment. The above-mentioned wireline tool, used to measure formation resistivity in cased wells, operates at approximately 1 Hz. As used herein, "vertical" means substantially parallel to the longitudinal axis of the wellbore in which the transmitter is deployed.

To make a borehole-to-surface measurement, one can also use a downhole tool that produces a vertical magnetic dipole moment in combination with an array of surface sensors. The sensors (receivers) on the surface can be of at least two types: (1) electrode sensors; and (2) magnetic field sensors. Electrode sensors may include, for example, stakes driven into the ground, or alternatively, non-polarizing electrodes (for lower frequency measurements), with the voltage measured between them. That would allow the production of a map of the voltage on the surface. Alternatively, for a magnetic field sensor, the magnetic field could be measured with sensors similar to those used for crosswell logging or with other sorts of conventional magnetic field sensors such as fluxgate magnetometers, or SQUIDs (Superconducting Quantum Interference Devices). Since such devices do not need to withstand downhole conditions, they can be far less expensive to make and easier to procure, setup, and operate than downhole tools.

For example, the above-mentioned LWD tool makes two types of measurements. One is the impedance of the downhole transmitter; that is, the ratio V/I for the voltage and current across the insulating gap. That gives a local measurement that is roughly proportional to the formation resistivity. In addition, the signal (i.e., voltage) at the surface is measured between the wellhead and a stake placed some distance away. As the well is drilled and the LWD tool gets farther from the wellhead, the signal strength decreases. The rate of decrease is a function of the geometry of the well and also the resistivity of the formation. The more conductive the formation, the more rapidly the signal strength decreases. By monitoring the signal strength, low resolution, deep measurements of the formation resistivity are obtained. One can generalize this second measurement type by introducing an array of sensors on the surface to obtain a map of the subsurface resistivity. In addition, one can measure the magnetic field using an array of surface receivers, in addition to the electric field, to provide increased lateral sensitivity around the borehole. The measurements can be made while the tool is being used in its normal role as an LWD telemetry tool, without additional rig time. Thus, an open-hole log may be produced.

Thus, in one embodiment, the downhole transmitter can be moved, either for the specific purpose of enhancing the determination of the earth formation properties, or because of the nature of the wellbore operation. It may be possible to increase the efficiency of the wellbore operation by performing some of the measurements while the transmitter is stationary and some of the measurements while the transmitter is moving.

Describe Downhole Magnetic Dipole Transmitter.

FIG. 1 illustrates system 100 with a transmitter tool 102 that has been lowered into a wellbore 104 by a carrier structure 106. The carrier structure 106 can be a wireline, coiled tubing, or any other carrier structure that extends from a wellhead of the wellbore 104. The carrier structure 106 includes a communications medium (e.g., electrical communications medium, optical communications medium, etc.) to allow for communication between the transmitter tool 102 and surface equipment 108, as well as to deliver power to the transmitter tool 102. The carrier structure 106 is preferably a high power cable, such as Nu Power™, as described in commonly owned U.S. Pat. Nos. 7,586,313 and 7,259,689, each of which is incorporated in its entirety by reference.

The surface equipment 108 generally includes a computer that has a processor and storage media. Software is executable on the processor to perform predefined tasks. In accordance with some embodiments, the software can process measurement data received from the tool to determine formation characteristics. The surface equipment 108 may be transportable, such as located in a wireline truck, or may also be located at a location remote from the wellsite. In such embodiments, data may be transferred from the wellsite to the surface equipment 108 via any of many well-known methods, including but not limited to, via satellite or wireless connection, to as simple a method as recording the data to a storage medium, and physically moving the storage medium to an off-site surface equipment computer for processing.

The wellbore 104 can be lined with casing 109 comprising steel having a high chromium content, or any other casing is non-magnetic and has a lower conductivity than standard casing. Casing 109 is put in place to stabilize the wellbore 104, protect fresh water formations, isolate a zone of lost returns and/or isolate formations with significantly different pressure gradients. Also disposed along the length of the wellbore 104, various collars or centralizers 110 may be deployed to, respectively, couple lengths of casing together and keep the casing 109 from contacting the wall of the wellbore 104 prior to cementing the casing 109 in place. In a typical well, wells are completed with casing segments that are approximately 30 to 40 feet long, jointed together by casing collars, and each casing segment has one or maximum two casing centralizers.

An array of electromagnetic sensors 112 (either electric field sensors or magnetic field sensors or a combination of the two) is deployed at a location outside of the well, at the seafloor surface 114 or at locations 116 on land or towed in shallow water. Although twelve receivers with certain orientations are shown in FIG. 1, it is noted that in alternative implementations, any different number of receivers can be employed, from one to more than one, and at various orientations.

In the embodiment shown in FIG. 1, a portion of the wellbore 104 is open, that is, not yet cased. In order to characterize targets in the formation at depths of investigation about the uncased portion of wellbore, the transmitter tool 102 is deployed to the desired depth of investigation, activated, and drawn back up towards the surface, as measurements are taken by the array(s) of electromagnetic sensors 112. As such, a single pass of the transmitter tool 102 through a range of depths about the depth of investigation produces a plurality of measurements from which formation characteristics can be determined.

Figure 2:
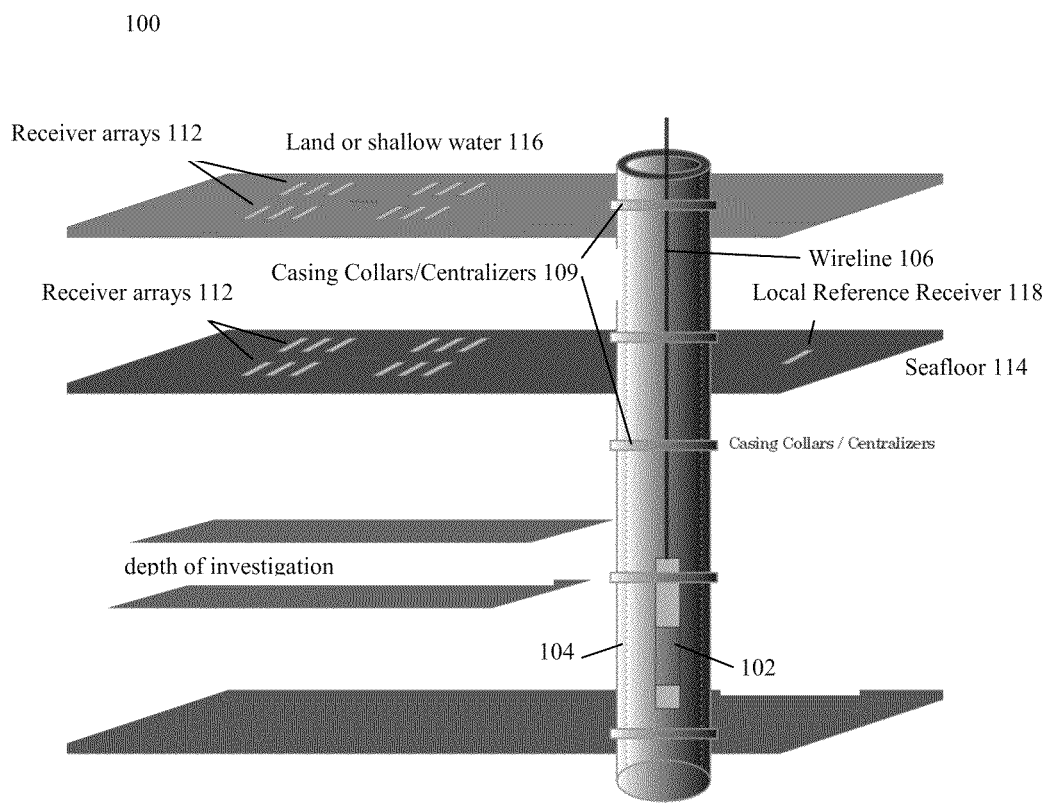

Now turning to FIG. 2, the system 100 of FIG. 1 with a transmitter tool 102 that has been lowered into a wellbore 104 by a carrier structure 106, with casing 109 (along with occasional casing collars and centralizers 110) extending throughout the desired depth of investigation. In the embodiment shown in FIG. 2, an additional sensor is added on the seafloor as a local reference receiver station 118. The location of the local reference receiver station 118 is outside, but close to, the well on the seafloor or surface, and is thus located apart from where the targeted geology in the formation. The local reference receiver station 118 measures the effective transmitter moment of the transmitter tool 102 just outside the casing 109. With the known effective moment of the transmitter in casing measured this way outside the casing 109, the far field measured in the relatively remote receiver stations of the array of receivers can be normalized directly to remove the transmitter casing effect.

Figure 3:
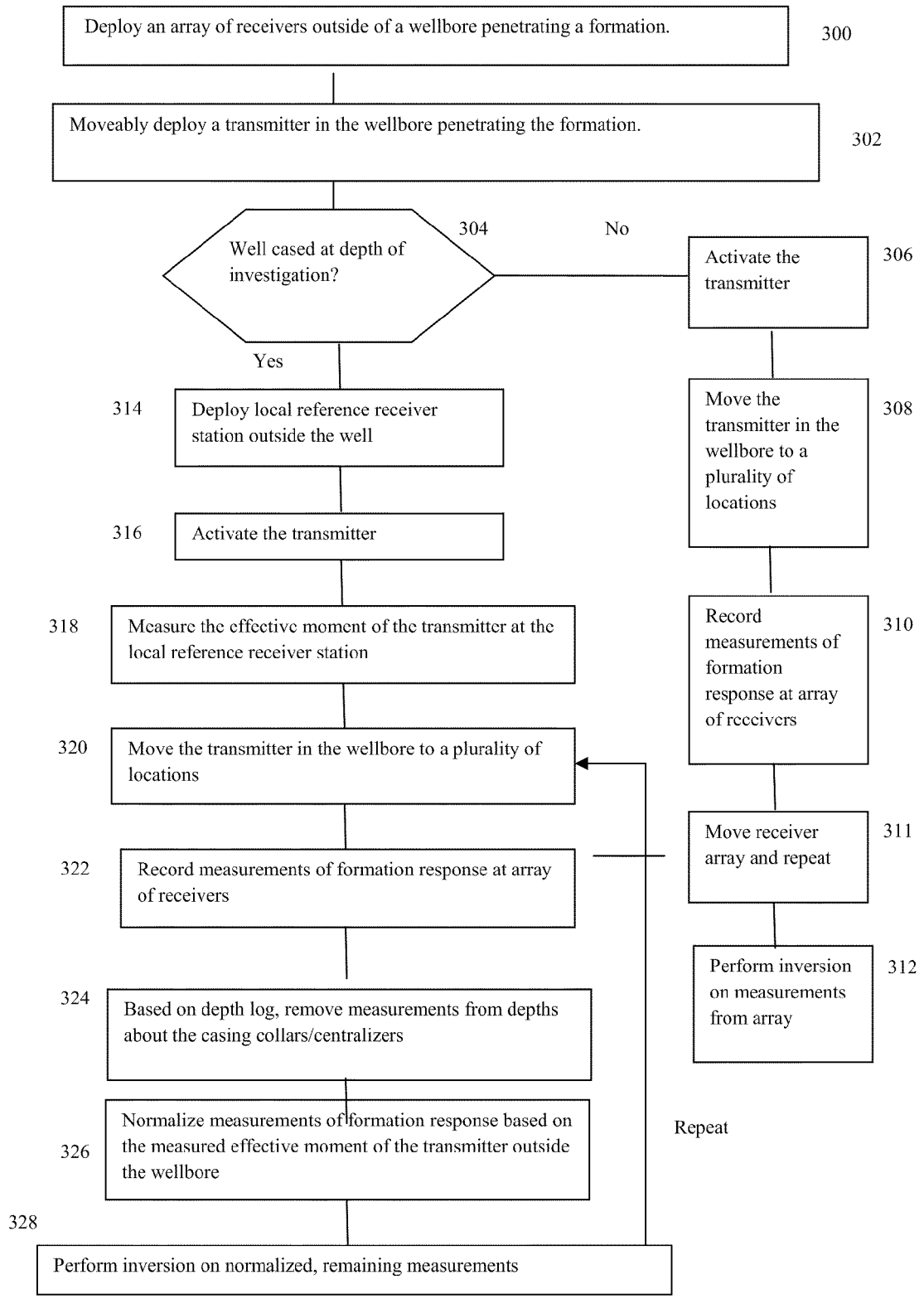
FIG. 3 shows a flowchart describing the steps in one embodiment of the disclosed method.

Turning now to FIG. 3, a flowchart of a general method of conducting a borehole to surface electromagnetic survey is shown. The method begins at 300 with deploying an array of receivers outside of a wellbore penetrating a formation. Arranging the array of receivers on the seafloor or surface is time and cost efficient comparing to towing a transmitter for downhole receivers. At 302, a transmitter is moveably deployed in the wellbore penetrating the formation. The transmitter comprises either an electric dipole or magnetic dipole transmitter source depending on the degree of sensitivity necessitated by the particular survey being performed. The magnetic dipole transmitter inherently has a magnetic moment, which depends primarily on the design of the logging cable, the number of turns of the transmitter coil, and the magnetic permeability of the transmitter core. Using, as noted above, NuPower™ cabling technology, it is possible to achieve delivery of high power to the transmitter in order to, in turn, achieve a large magnetic moment. In at least some embodiments, a transmitter having a core length of not more than eight (8) feet is desirable, such that the effective magnetic moment is not reduced, but the amount of usable data is increased in steel cased wells since fewer data points are affected by casing collars and casing centralizers, and will be thrown away.

At 304, a determination is made as to whether the wellbore is cased at the particular depth of investigation. If the wellbore is not cased at the depth of investigation, at 306 the transmitter is activated, and at 308, the transmitter is moved in the wellbore to a plurality of locations. More specifically, the transmitter is moved through the wellbore by drawing the tool upwards on the carrier structure 106 described above. Different transmitters may be used for open holes versus cased holes.

At 310, measurements of the formation response are recorded by the array of receivers for each of the plurality of locations, in accordance with methods already described and claimed in commonly owned/assigned U.S. patent application Ser. No. 12/603,053, herein incorporated by reference in its entirety. In some cases, the receiver array may be moved to another location to completely cover all of the survey area and log the transmitter again, as shown in optional step 311. At 312, inversion is performed on the measurements of the formation response, allowing a determination of a formation characteristic in the area around the depth of investigation.

Alternatively, if at 304, the determination is that the wellbore is cased at the depth of investigation, then at 314, an additional sensor, that of a local reference receiver station, is deployed outside the well. Preferably, the local reference receiver station is positioned outside the well casing on the seafloor. At 316 the transmitter is activated. At 318, we measure the effective magnetic moment of the transmitter at the local receiver station outside the well casing, such that we know how the casing affects the magnetic moment of the transmitter in the near-field in an area where there is little to no geological formation to affect the field, so we can then later use the effective magnetic moment of the transmitter to eliminate some of the effects of casing on the formation response (measured at the array of receivers). In a steel cased hole section, a cased-hole transmitter sonde will be used, such as a shorter version of the sonde used in Schlumberger's Deep-Look EM system.

At 320, the cased hole transmitter is moved in the wellbore to a plurality of locations. More specifically, the transmitter is moved through the wellbore by drawing the tool upwards on the carrier structure 106 described above. At 322, measurements of the formation response are recorded by the array of receivers for each of the plurality of locations, in accordance with methods already described and claimed in commonly owned/assigned U.S. patent application Ser. No. 12/603,053, herein incorporated by reference in its entirety.

At 324, we remove from the measurements of 322 measurements that correspond, on the depth log, to locations around and about the casing collars and centralizers, in that casing collars and centralizers cause some relatively large imprints on the measured field. With the measurements that correspond to depths around casing collars and centralizers eliminated, at 326 we further normalize the measurements of the formation response (measured at the far-field receiver arrays) with the measured effective magnetic moment of the transmitter measured in 318. As discussed above, in some cases, the receiver array may need to be moved to another location to completely cover all of the survey area and log the transmitter again.

At 328, inversion is performed on the measurements of the formation response, allowing a determination of a formation characteristic in the area around the depth of investigation with reduced or eliminated effects due to casing, casing collars, and centralizers.

Note that the process including tasks in FIG. 3 can be continually performed as the tool is lowered, or up-logged in the wellbore 104. Tasks 312 and 322-328 depicted in FIG. 3 can be performed by the software executed in the computer 110 shown in FIG. 4.

Figure 4:
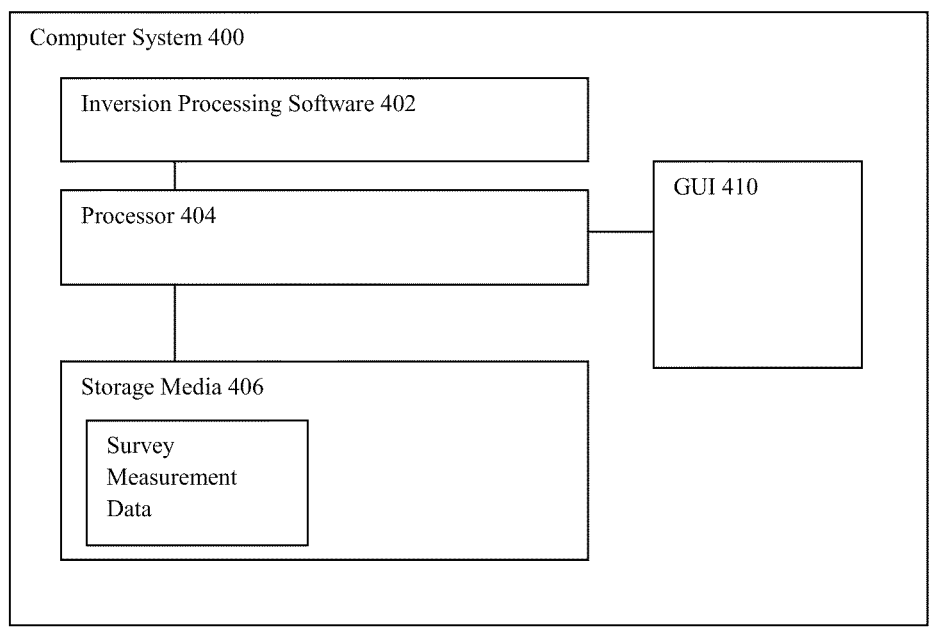
FIG. 4 shows a block diagram of a computer system used in accordance with an embodiment.

FIG. 4 illustrates a computer system 400 that can be used to perform tasks according to an embodiment. The computer system 400 includes inversion processing software 402 that is executable on a processor 404. The processor 404 is connected to storage media 406, which stores survey measurement data 408 that had been received from the various receivers. The storage media 406 can be implemented with one or more disk-based storage devices or integrated circuit (IC) storage devices. The computer system further includes a graphical user interface (GUI) 410 on which a graphical representation of the survey inversion can be output and represented in 2D, 3D, and even 4D.

Instructions of software to carry out processing and inversion described above are loaded for execution on a processor (such as processor 400 in FIG. 4). The processor includes microprocessors, microcontrollers, processor modules or subsystems (including one or more microprocessors or microcontrollers), or other control or computing devices. A "processor" can refer to a single component or to plural components (e.g., one or multiple central processing units in one or more computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

Advantages:

In standard surface-to-borehole methodology, the source is on the surface and the receiver sensors are moved through a length of the borehole. After each transit of the downhole sensor, the source is typically moved to a new location and the process is repeated. This is very time consuming. If multiple sensor arrays are instead placed on the surface in the scale of kilometers, the transmitter only needs to be run through the well once to obtain measurements at a plurality of locations. This saves considerable valuable rig time. In addition, a more complete set of sensor positions can be obtained since the rig time does not depend upon the number of measurements. The setup time to deploy surface receivers is generally much shorter than the setup time for surface transmitters.

Because the contact resistance downhole is generally very low, large currents can be used without needing high power (i.e., low voltage may be used). If high voltage is used, it would be applied in the borehole instead of at surface transmitter locations. There is also no need to attempt or arrange to lower the contact resistance of the downhole transmitter as is often done for surface transmitter electrodes. The transmitter waveform can be modified to shape the frequency or time domain content to enhance the ability to increase the signal-to-noise ratio at desired frequencies or transient times, or to otherwise optimize the transmitted energy for the desired formation imaging.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A system for evaluating a formation around a geological target of interest in the vicinity of a wellbore drilled in the formation and cased in steel, comprising:
    a logging cable that moveably deploys a dipole electromagnetic transmitter in the wellbore drilled in the formation, the dipole electromagnetic transmitter configured to transmit electromagnetic energy into the formation from a plurality of transmitter locations as the high power logging cable moves the dipole electromagnetic transmitter from a first location in the wellbore to a second location in the wellbore;
    an array of electromagnetic receivers deployed at one or more locations outside of the wellbore, wherein the array of electromagnetic receivers is also used to collect at least one of marine magnetotelluric data, land magnetotelluric data, and marine controlled source electromagnetic data;
    at least one local reference electromagnetic receiver at a location relatively proximate the wellbore and outside of steel casing configured to measure an effective moment of the electromagnetic transmitter inside the steel casing; and
    a surface logging computer coupled to the logging cable, configured to normalize the signals received by the array of electromagnetic receivers based upon the effective moment and to determine a property of the formation.

2. The system according to claim 1, wherein the array of receivers is also used to collect land controlled source electromagnetic data.

3. The system according to claim 2 wherein the signals received by the array of electromagnetic receivers is used together with at least one of marine magnetotelluric data, land magnetotelluric data, land controlled source electromagnetic data, and marine controlled source electromagnetic data to determine a property of the formation.

4. The system according to claim 1, wherein the dipole transmitter comprises a magnetic dipole transmitter comprising a coil disposed about a core, producing a large moment when activated.

5. The system according to claim 4, wherein the transmitter is optimized for use in a well cased in steel, having a core not longer than approximately eight feet long.

6. The system according to claim 1, wherein the dipole transmitter comprises an electric dipole transmitter comprising circuitry modulating voltage applied across an insulated gap.

7. The system according to claim 1, wherein the array of receivers comprises any combination of magnetic field receivers and electric field receivers.

8. The system according to claim 1, wherein the wellbore comprises an open, un-cased wellbore.

9. The system according to claim 1, wherein the steel comprises magnetic steel or non-magnetic chromium steel.

10. The system according to claim 1, wherein the array of electromagnetic receivers is located on land, on the sea bottom, towed on a cable system, or any combination thereof.

11. The system according to claim 1, wherein the array of electromagnetic receivers comprise electric field sensors, magnetic field sensors, seismic sensors, or a combination of those sensors.

12. A method for conducting a borehole to surface electromagnetic survey, comprising:

deploying a dipole transmitter at a downhole location in a wellbore;

deploying an array of electromagnetic receivers outside of the wellbore, wherein the array of receivers is also used to collect at least one of marine magnetotelluric data, land magnetotelluric data, and marine controlled source electromagnetic data;

deploying at least one local reference receiver station at a location relatively proximate the wellbore and outside steel casing configured to measure the effective magnetic moment of transmitter inside the steel casing;

activating the dipole transmitter, the local reference receiver station, and the array of electromagnetic receivers;

measuring a response of the formation at the array of electromagnetic receivers;

measuring the effective magnetic moment of the transmitter in the cased wellbore at the local reference receiver station;

normalizing the response of the formation based on the effective magnetic moment of the transmitter in the cased wellbore; and determining a property of the formation based on the normalized response of the formation.

13. The method according to claim 12, wherein the array of receivers is also used to collect land controlled source electromagnetic data.

14. The method according to claim 13, wherein the signals received by the array of electromagnetic receivers is used together with at least one of marine magnetotelluric data, land magnetotelluric data, land controlled source electromagnetic data, and marine controlled source electromagnetic data to determine a property of the formation.

15. The method according to claim 12, wherein the dipole transmitter comprises a magnetic dipole transmitter comprising a coil disposed about a core, producing a large moment when activated.

16. The method according to claim 13, further comprising optimizing the transmitter for use in a well cased in steel by selecting a core of a length not longer than approximately eight feet long.

17. The method according to claim 12, wherein the dipole transmitter comprises an electric dipole transmitter comprising circuitry modulating voltage applied across an insulated gap.

18. The method according to claim 12, wherein the array of receivers comprises any combination of magnetic field receivers and electric field receivers.

19. The method according to claim 12, wherein the wellbore comprises an open, un-cased wellbore.

20. The method according to claim 12, wherein the wellbore comprises a wellbore cased in magnetic steel or non-magnetic chromium steel, the method further comprising removing the data that was affected by casing collars and casing centralizers using the measurement of transmitter center monitor and coil impedance measurement.

21. The method according to claim 12, further comprising positioning the receivers on land.

22. The method according to claim 12, further comprising positioning the receivers on the sea bottom.

23. The method according to claim 12, further comprising towing the receivers on a cable system.

24. The method according to claim 12, wherein the receivers comprise electric field sensors, magnetic field sensors, seismic sensors, or a combination of those sensors.

25. A method for conducting an electromagnetic survey of a formation surrounding a borehole, comprising:

deploying a dipole electromagnetic transmitter into the borehole to a depth of investigation;

deploying an array of electromagnetic receivers outside of the wellbore;

measuring a response of the formation at the array of electromagnetic receivers, wherein the array of receivers is also used to collect at least one of marine magnetotelluric data, and magnetotelluric data, and marine controlled source electromagnetic data; and measuring an effective magnetic moment of the electromagnetic transmitter in the cased wellbore at the local reference receiver station;

normalizing the response of the formation measured at the array of electromagnetic receivers based on the effective magnetic moment of the transmitter in the cased wellbore;

determining a property of the formation based on the normalized response of the formation.

26. The method according to claim 25, wherein at the depth of investigation, the borehole is uncased.

27. The method according to claim 25, wherein at the depth of investigation, the borehole is cased, and further comprising: deploying at least one local reference receiver station at a location relatively proximate the wellbore and outside of the steel casing configured to measure the effective magnetic moment of the transmitter; and normalizing the response of the array of receivers based on the effective magnetic moment of the transmitter in steel casing.

* * * * *